US000001184H

United States Statutory Invention Registration [19]

[11] Reg. Number: H1184

Batra et al.

[43] Published: May 4, 1993

[54] PRECIPITATION STRENGTHENED URANIUM TUNGSTEN ALLOY

[75] Inventors: Ravi Batra, Rockaway; Sheldon Cytron, Mountain Lakes; Jerry C. LaSalle, Montclair, all of N.J.

[73] Assignee: The United States of America as represented by the Secretary of the Army, Washington, D.C.

[21] Appl. No.: 744,041

[22] Filed: Aug. 12, 1991

[51] Int. Cl.[5] ..... C22C 43/00; C22C 1/00

[52] U.S. Cl. ..... 420/3; 75/344; 420/590; 148/560; 148/401; 156/463

[58] Field of Search ..... 75/344; 420/1, 3, 590; 148/560, 401; 164/463

[56] References Cited

U.S. PATENT DOCUMENTS

| | | | |
|---|---|---|---|
| 1,760,440 | 5/1930 | Rentschler et al. | 313/310 |
| 2,197,380 | 4/1940 | Hensel et al. | 420/430 |
| 3,039,000 | 6/1962 | Kieffer et al. | 250/515.1 |
| 3,198,627 | 8/1965 | Layne et al. | 420/1 |
| 4,592,790 | 6/1986 | Globus | 148/126.1 |
| 4,913,220 | 4/1990 | Dickson | 164/463 |
| 4,959,194 | 9/1990 | Dunn et al. | 419/46 |
| 4,966,750 | 10/1990 | LaSalle et al. | 420/3 |
| 4,997,477 | 3/1991 | Kuk et al. | 75/338 |
| 5,035,854 | 7/1991 | Dunn et al. | 420/3 |

*Primary Examiner*—Donald P. Walsh
*Assistant Examiner*—Ngoclan T. Mai
*Attorney, Agent, or Firm*—Anthony T. Lane; Edward Goldberg; Michael Sachs

[57] ABSTRACT

A method for making uranium-tungsten alloy of high strength comprising rapidly chilling a molten solution of tungsten in uranium to form a ribbon. Subsequent to pulverizing and consolidation, heating effects a precipitation of tungsten in the uranium to effect significant strengthening. A strengthened uranium with ½-5%, by weight of tungsten is particularly useful for KE penetrators.

7 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRECIPITATION STRENGTHENED URANIUM TUNGSTEN ALLOY

GOVERNMENTAL INTEREST

The invention described herein may be manufactured, used and licensed by or for the Government for Government purposes without the payment to us of any royalties thereon.

BACKGROUND OF THE INVENTION

The present invention is directed to a new Uranium-Tungsten composition and its method of manufacture and treatment to achieve a product with enhanced mechanical properties.

Kinetic Energy (KE) penetrators are conventionally made of depleted uranium alloyed with titanium. This alloy possesses a desirable combination of strength and ductility for such applications. Conventional processing of this alloy to achieve the high yield strength properties required for such penetrators involve heat treatment to the gamma phase (about 850 degrees C.), quenching in oil or water and aging in the range of 350 to 450 degrees C.

Recent advances in armor is putting increased demands on methods for defeating it. There exists a need to further improve the strength properties of depleted uranium over that provided by the existing alloy for KE penetrators.

SUMMARY OF THE INVENTION

A molten solution of uranium and tungsten is rapidly chilled in ribbon form to retain the tungsten in supersaturated solution in the uranium. The ribbon may then be pulverized into a powder, formed into a desired shape and subjected to heat and/or pressure to consolidate the metal into a desired product. Further heat treatment causes the tungsten to precipitate and in so doing impedes further grain growth. The net result is a significant increase in the yield strength of the metal. A particularly useful application of the present invention is in the manufacture of KE penetrators with enhanced capability to penetrate modern armor.

It is the object of the present invention to provide a ne and useful uranium-tungsten alloy with enhanced mechanical properties.

It is also the object of the present invention to produce shaped products of enhanced strength and ductility.

It is a further object of the present invention to provide KE penetrators of enhanced armor piercing capabilities.

DETAILED DESCRIPTION OF THE INVENTION

Tungsten as such has very little solubility in uranium. However, it is possible to retain tungsten in supersaturated solution when rapidly cooled from the liquid state.

It has been determined when uranium and ⅛–5%, by weight of tungsten is rapidly cooled from a liquid state, the tungsten is retained in solution. The tungsten on further heat treatment will come out of the solution as a fine precipitate and will act to impede grain growth. According to Hall-Petch equation, increase in yield strength due to gain size effect can be significant.

It should be noted that an aging heat treatment such as is required for the typical U-3/4 Ti composition is not a requirement of the present alloy system. Also, this uranium-tungsten alloy eliminates the need of general operation and all the problems of quench cracks, distortion, etc. while maintaining comparable strengths.

Another advantage of the present U-W alloys is that tungsten has nearly the same density as uranium, thus there is not a loss of density as there is when uranium is alloyed with lighter density metals such as titanium or molybdenum. High density is an important property for some applications such as KE penetrators.

EXAMPLES

A number of alloys of DU containing ⅛ to 5% W were melted in a quartz tube in 100 gms batches. The molten metal was poured on to a 10" diameter copper wheel rotating at 6000 linear feet per minute to produce ribbon. The ribbon thus produced was heat-treated at 600 degrees C. and 800 degrees C. for one hour. A microscopic examination of the ribbon showed extremely fine precipitates of W in Uranium. Some of these precipitates were found at triple boundary points indicating pinning of grain boundaries. The precipitate did not grow when exposed to same temperatures for an appreciable amount of time.

Initial examination of the material indicates that W is very potent in pinning the grains and thereby reducing their tendency to grow.

The ribbon produced can be pulverized into powder by conventional mechanical means and can be consolidated using one of the conventional processes such as HIP (hot isostatic pressure bonding such as described in U.S. Pat. No. 3,523,148), extrusion, hot pressing or any combination there of. Such consolidated material can be heat treated at about 600 degrees C. for tungsten to come out as a fine precipitate for stabilizing the grain structure.

While certain preferred embodiments of the present invention have been disclosed in detail, it is to be understood that various modifications may be adopted without departing from the spirit of the invention or scope of the following claims.

We claim:

1. A method for making uranium-tungsten alloy having superior mechanical properties comprising:

(a) forming a molten solution of tungsten in uranium;

(b) rapidly chilling such solution to form an alloy comprising uranium containing tungsten in supersaturated solution.

2. The method of claim 1 wherein said molten solution is rapidly chilled in steps (b) by pouring such solution onto a moving chill surface to effect rapid cooling and solidification into a ribbon.

3. The method of claim 2 wherein the moving chill surfaces is the surface of a rotating cylinder.

4. The method of claim 1 wherein the tungsten is present in amounts of from ⅛–5%, by weight.

5. An alloy comprising uranium and from ⅛–5% tungsten in supersaturated solution.

6. An article of manufacture formed of depleted uranium containing from ⅛–5% tungsten at least part of which is present as a fine precipitate in the grain boundaries of said uranium.

7. The article of claim 6 which consists of a KE penetrator.

* * * * *